(12) United States Patent
Cunha et al.

(10) Patent No.: US 7,717,676 B2
(45) Date of Patent: May 18, 2010

(54) HIGH ASPECT RATIO BLADE MAIN CORE MODIFICATIONS FOR PERIPHERAL SERPENTINE MICROCIRCUITS

(75) Inventors: Francisco J. Cunha, Avon, CT (US); Scott W. Gayman, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 693 days.

(21) Appl. No.: 11/636,801

(22) Filed: Dec. 11, 2006

(65) Prior Publication Data

US 2008/0138209 A1 Jun. 12, 2008

(51) Int. Cl.
*F01D 5/18* (2006.01)
(52) U.S. Cl. .................................... 416/97 R
(58) Field of Classification Search ................ 416/97 R
See application file for complete search history.

(56) References Cited

U.S. PATENT DOCUMENTS

2006/0275119 A1* 12/2006 Liang ....................... 416/97 R

FOREIGN PATENT DOCUMENTS

| GB | 2262314 A | * | 6/1993 |
| JP | 04203203 A | * | 7/1992 |

* cited by examiner

*Primary Examiner*—Richard Edgar
(74) *Attorney, Agent, or Firm*—Bachman & LaPointe, P.C.

(57) ABSTRACT

A turbine engine component, such as a turbine blade, has an airfoil portion having a pressure side wall and a suction side wall, a first cooling circuit embedded within the pressure side wall, which first cooling circuit has at least two passageways embedded within the pressure side wall, a second cooling circuit embedded within the suction side wall, which second cooling circuit has at least two passageways embedded within the suction side wall, at least one cooling fluid supply cavity located between the pressure and suction side walls, each cooling fluid supply cavity having at least one projecting portion extending between adjacent ones of the embedded passageways in the first cooling circuit or adjacent ones of the embedded passageways in the second cooling circuit, and each projecting portion communicating with at least one film cooling hole. A method for forming the turbine blade component is also described.

17 Claims, 4 Drawing Sheets

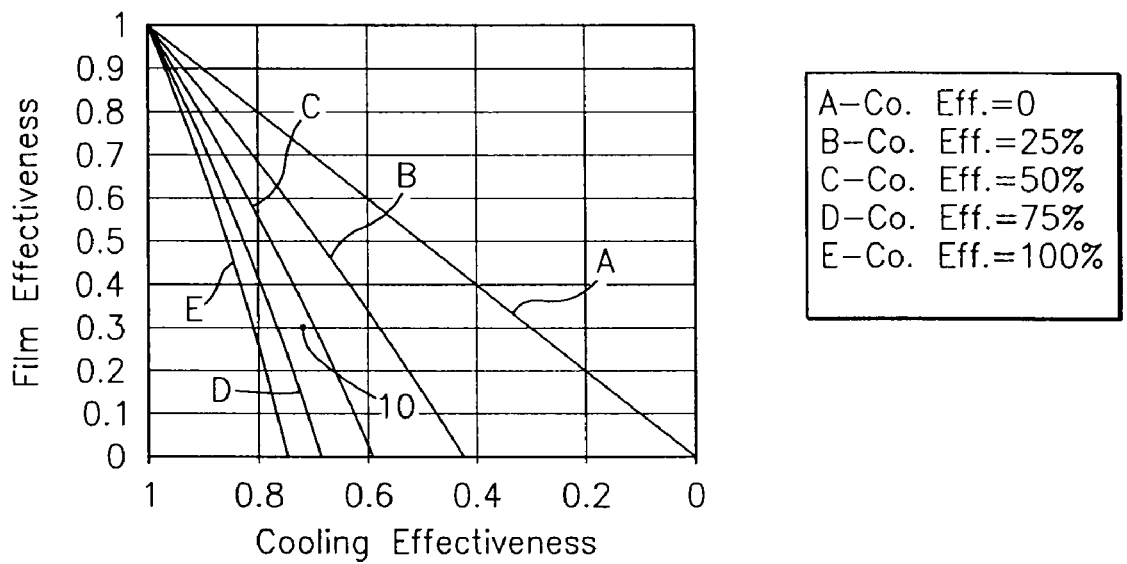
*FIG. 1*
(PRIOR ART)
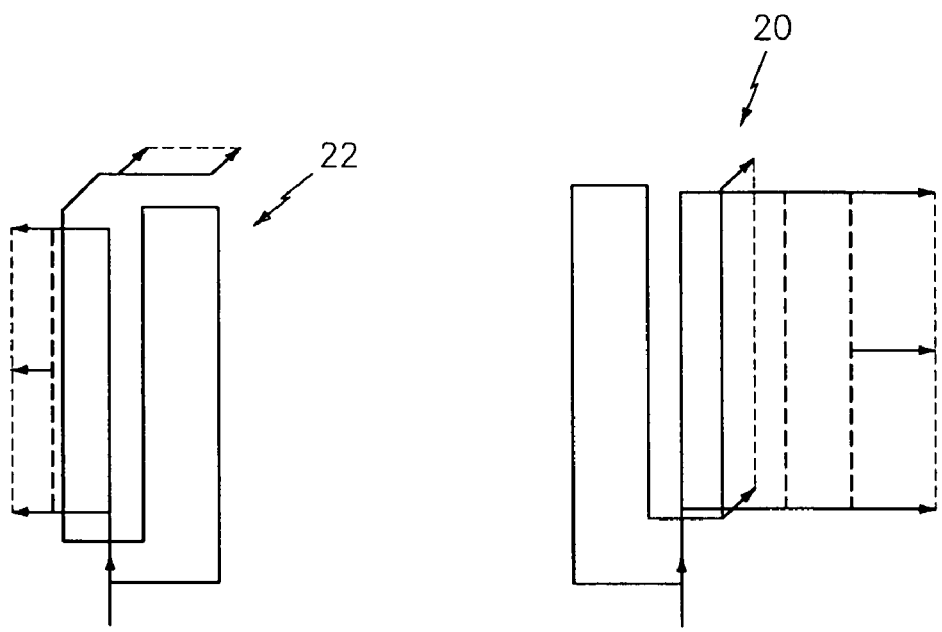
*FIG. 2A*
(PRIOR ART)
*FIG. 2B*
(PRIOR ART)

HIGH ASPECT RATIO BLADE MAIN CORE MODIFICATIONS FOR PERIPHERAL SERPENTINE MICROCIRCUITS

BACKGROUND (1) Field of the Invention

The present invention relates to a turbine engine component, such as a turbine blade, having modifications which minimize thermal gradients, allows for film cooling, and avoid back flow margin problems as the film holes are fed with a flow of cooling fluid from the main supply cavities.

(2) Prior Art

The overall cooling effectiveness is a measure used to determine the cooling characteristics of a particular design. The non-achievable ideal goal is unity. This implies that the metal temperature is the same as the coolant temperature inside an airfoil. The opposite can also occur where the cooling effectiveness is zero implying that the metal temperature is the same as the gas temperature. In that case, the blade material will certainly melt and burn away. In general, existing cooling technology allows the cooling effectiveness to be between 0.5 and 0.6.

More advanced technology, such as supercooling, should be between 0.6 and 0.7. Microcircuit cooling can be made to produce cooling effectiveness higher than 0.7. FIG. 1 shows a durability map of cooling effectiveness versus the film effectiveness for different lines of convective efficiency. Placed in this map is a point related to the advanced serpentine microcircuits of FIGS. 2A and 2B. FIG. 2A illustrates a suction side cooling circuit 22, while FIG. 2B illustrates a pressure side cooling circuit 20.

| Dimensionless Parameters for serpentine microcircuit | |
|---|---|
| Beta | 2.898 |
| Tg | 2581 [F.] |
| Tc | 1365 [F.] |
| Tm | 2050 [F.] |
| Tm_bulk | 1709 [F.] |
| Phi_loc | 0.437 |
| Phi_bulk | 0.717 |
| Tco | 1640 [F.] |
| Tci | 1090 [F.] |
| Eta_c_loc | 0.573 |
| Eta_f | 0.296 |

Table I provides the dimensionless parameters used to plot the design point in the durability map. It should be noted that the overall cooling effectiveness from the table is 0.717 for a film effectiveness of 0.296 and a convective efficiency (or ability to pick-up heat) of 0.573 (57%).

As illustrated in FIG. 3, the corresponding cooling flow for a turbine blade having this serpentine configuration is 3.5% engine flow. Most traditional high pressure turbine blade designs use about 5% engine flow. As a result, this design leads to significant cooling flow reduction. This in turn has positive effects on cycle thermodynamic efficiency, turbine efficiency, rotor inlet temperature impacts, and specific fuel consumption.

It should be noted from FIG. 3 that the flow passing through the pressure side serpentine microcircuit is 1.165% WAE in comparison with 0.428% WAE in the suction side serpentine microcircuit for this arrangement. This represents a 2.7 fold increase in cooling flow relative to the suction side microcircuit. The reason for this increase stems from the fact that the thermal load to the part is considerably higher for the airfoil pressure side. As a result, the height of the microcircuit channel should be 1.8 fold increase over that of the suction side. That is 0.022 vs. 0.012 inches.

Besides the increased flow requirement on the pressure side, the driving pressure drop potential in terms of source to sink pressures for the pressure side circuit is not as high as that for the suction side circuit. In considering the coolant pressure on the pressure side circuit, at the end of the third leg, the back flow margin, as a measure of internal to external pressure ratio, is low. As a consequence of this back flow issue, the metal temperature increases beyond that required metal temperature close to the third leg of the pressure side circuit.

Since the thermal load to the part is high on the pressure side, particularly toward the aft end of the airfoil, it is desirable to introduce film cooling on that side of the airfoil. However, a low back flow will likely develop when cooling is extracted out of the peripheral circuit. An alternative way around this problem is to introduce film fed from the main cavities. As shown in FIG. 4, there are regions A, B, and C with low heat transfer that define the walls of the cooling channels used in the airfoil. This allows for space between the two legs to increase. This in turn permits EDM hole drilling for film hole cooling the airfoil as shown by the location of the shaped holes D in FIG. 4.

As the peripheral circuits are imbedded in the airfoil wall, regions of high temperature gradients or high heat flux vectors can develop between the legs of the circuit. Thus, it is desirable to reduce these regions of high thermal gradients.

SUMMARY OF THE INVENTION

In accordance with the present invention, there is provided a turbine engine component having modifications which minimize thermal gradients, allows for film cooling, and avoid back flow margin problems as the film holes are fed with flow from the main supply cavities.

In accordance with the present invention, there is provided a turbine engine component. The turbine engine component broadly comprises an airfoil portion having a pressure side wall and a suction side wall, a first cooling circuit embedded within the pressure side wall, which first cooling circuit has at least two passageways embedded within the pressure side wall, a second cooling circuit embedded within the suction side wall, which second cooling circuit has at least two passageways embedded within the suction side wall, at least one cooling fluid supply cavity located between the pressure and suction side walls, each said cooling fluid supply cavity having at least one projecting portion extending between adjacent ones of the embedded passageways in the first cooling circuit or adjacent ones of the embedded passageways in the second cooling circuit, and each projecting portion communicating with at least one film cooling hole.

Further in accordance with the present invention, there is provided a method for forming an airfoil portion of a turbine engine component, which method broadly comprises the steps of providing a first peripheral core having a plurality of legs in a location spaced from a first side of a mold, positioning a second peripheral core having a plurality of legs in a location spaced from a second side of the mold, positioning at least one central core between the first peripheral core and the second peripheral core so that each the core has at least one bump positioned between two adjacent legs of one of the first and second peripheral cores, casting an airfoil portion from a superalloy material, and removing the peripheral cores and the at least one central core so as to leave a first cooling microcircuit embedded in a pressure side wall, a second cooling microcircuit embedded in a suction side wall, and at least one central cooling fluid supply cavity having at least one projecting portion where the at least one bump had been located.

Other details of the high aspect ratio blade main core modifications for peripheral serpentine microcircuits of the present invention, as well as other objects and advantages attendant thereto, are set forth in the following detailed description and the accompanying drawings wherein like reference numerals depict like elements.

BRIEF DESCRIPTION OF THE DRAWINGS

FIG. 1 is a durability map for a high pressure turbine blade cooling design;

FIG. 2A is a schematic representation of a suction side peripheral serpentine cooling circuit;

FIG. 2B is a schematic representation of a pressure side peripheral serpentine cooling circuit;

DETAILED DESCRIPTION OF THE PREFERRED EMBODIMENT(S)

Figure 3:
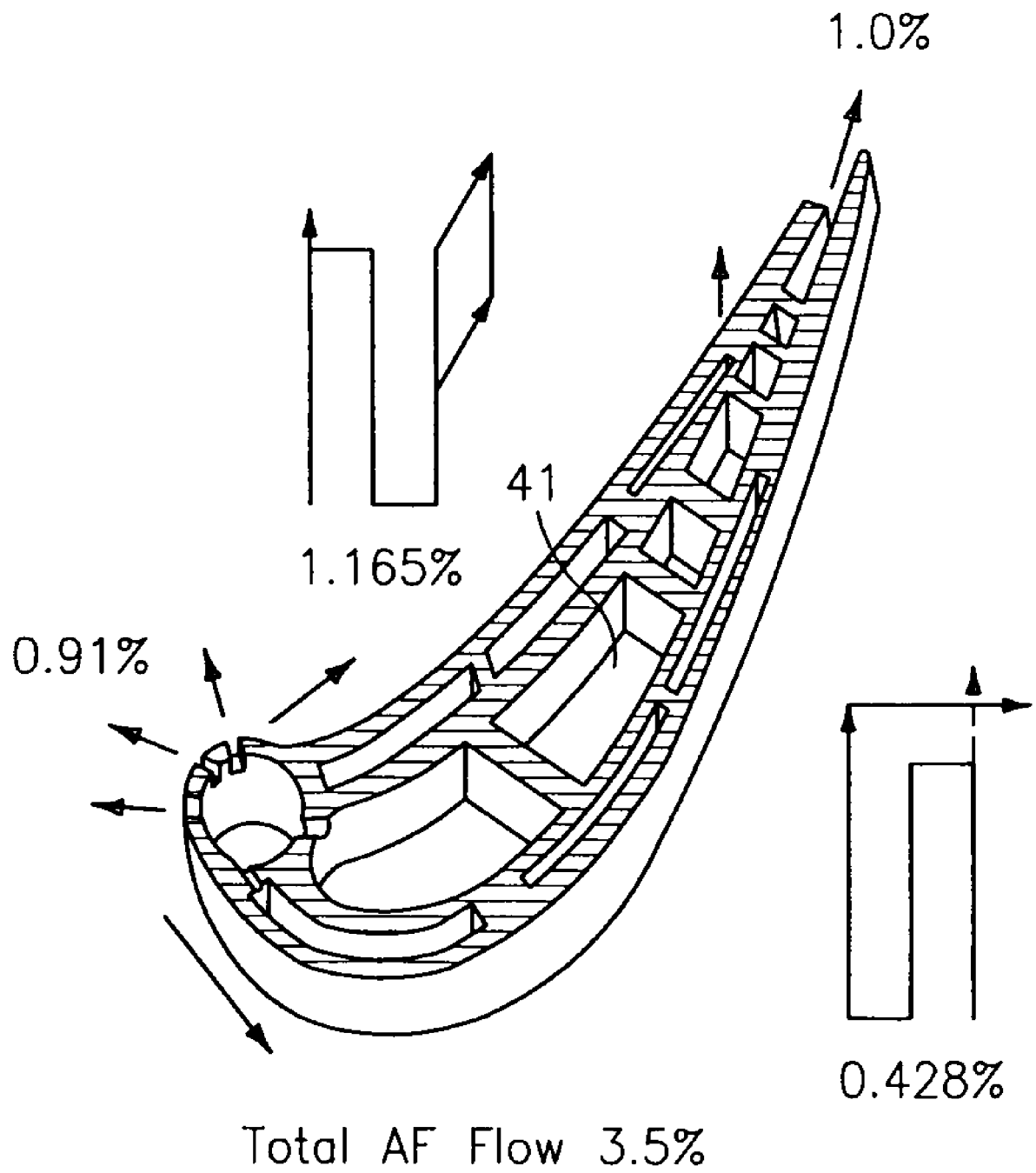
FIG. 3 is a cooling flow distribution for a high pressure turbine blade with serpentine microcircuit embedded in the airfoil walls.
Figure 4:
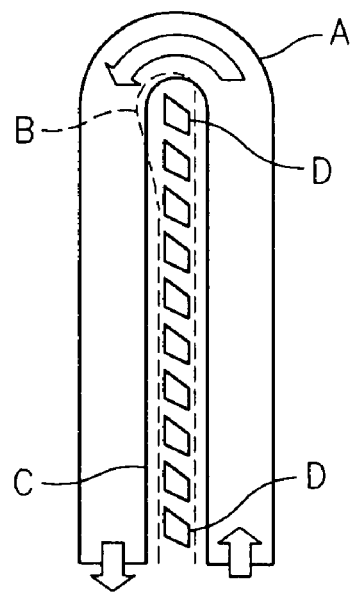
FIG. 4 is a schematic representation of contoured channels for peripheral microcircuit cooling with film cooling in between cooling legs.
Figure 5:
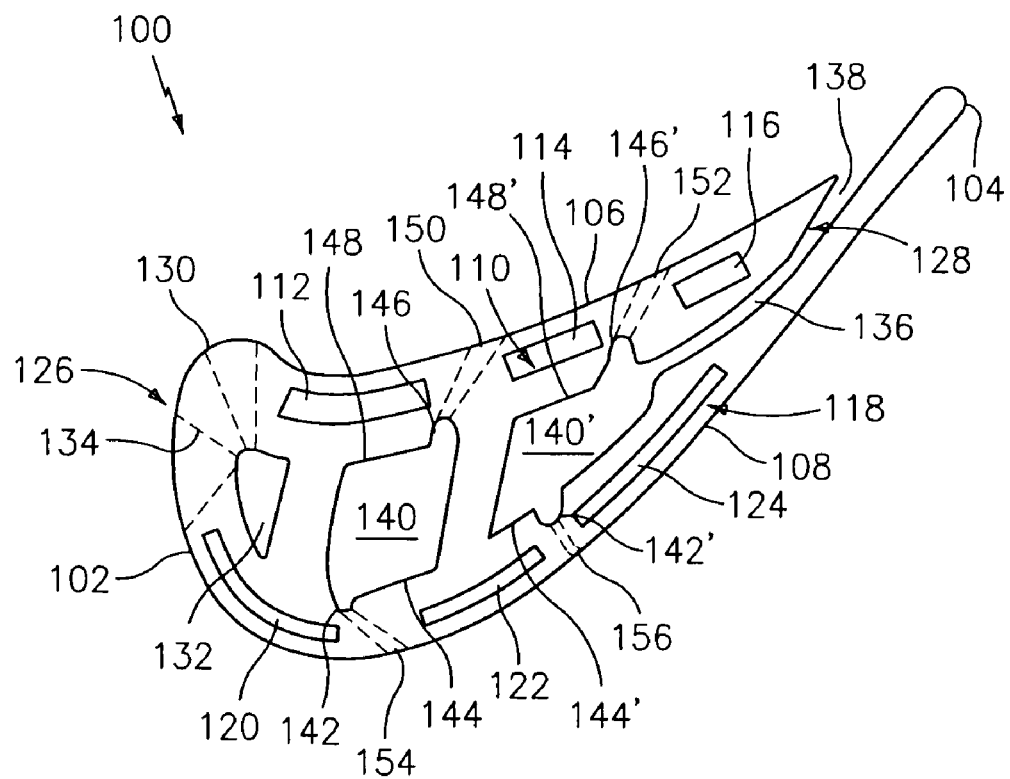
FIG. 5 is cross sectional area of the airfoil portion of a turbine engine component in accordance with the present invention.

Referring now to FIG. 5 of the drawings, there is shown an airfoil portion 100 of a turbine engine component such as a turbine blade. The turbine engine component may have other integrally formed elements such as a platform and a root portion, but for the sake of convenience these well known elements have not been illustrated in the drawings.

The airfoil portion 100 has a leading edge 102, a trailing edge 104, a pressure side wall 106 extending between the leading edge 102 and the trailing edge 104, and a suction side wall 108 also extending between the leading edge 102 and the trailing edge 104. Embedded within the pressure side wall 106 is a first cooling circuit 110. The cooling circuit 110 may have any desired configuration such as a serpentine configuration with three interconnected legs 112, 114, and 116 through which a cooling fluid flows. The serpentine configuration of the pressure side cooling circuit 110 may be that shown in FIG. 2b. Embedded within the suction side wall 108 is a second cooling circuit 118. The second cooling circuit 118 may also have any desired configuration such as a serpentine configuration with three interconnected legs 120, 122, and 124 through which a cooling fluid flows. The serpentine configuration of the suction side cooling circuit 118 may be that shown in FIG. 2a.

The airfoil portion 100 may be provided with a leading edge cooling circuit 126 and a trailing edge cooling circuit 128. The leading edge cooling circuit 126 may comprise a plurality of cooling holes 130 communicating with a cooling fluid supply cavity 132 via a plurality of passageways 134. The trailing edge cooling circuit 128 may comprise one or more cooling fluid passageways 136 terminating in a film cooling hole 138.

Positioned between the suction side wall 108 and the pressure side wall 106 is a plurality of cooling fluid supply cavities 140 and 140'. While two fluid cooling supply cavities 140 and 140' have been illustrated, there may be more than two such cavities if desired. The cooling circuits 110 and 118 may receive cooling fluid from the cavities 140 and 140' in any suitable manner known in the art.

It is desirable to provide film cooling through the pressure side wall 106 and the suction side wall 108. To this end, each of the cavities 140 and 140' has a first projecting portion 142, 142' on a first wall 144, 144' of the cavity 140, 140' and a second projecting portion 146, 146' located on a second wall 148, 148' of the cavity 140, 140', which second wall 148, 148' is opposed to the first wall 144, 144'. The first projecting portion 142 of the cavity 140 is located between two legs 120 and 122 of the suction side cooling circuit 118 and the first projecting portion 142' of the cavity 140' is located between the legs 122 and 124 of the suction side cooling circuit 118. The second projecting portion 146 of the cavity 140 is positioned between legs 112 and 114 of the pressure side cooling circuit 110 and the second projecting portion 146' of the cavity 140' is positioned between the legs 114 and 116 of the pressure side cooling circuit 110.

Each of the projecting portions 142, 142', 146, and 146' extend radially along the length of the respective supply cavity 140, 140'. They may extend the entire length or just part of the length of the respective supply cavity 140, 140'.

As mentioned before, it is desirable to provide film cooling over the external surfaces of the pressure side wall 106 and the suction side wall 108. To this end, a plurality of film cooling holes 150, 152, 154, and 156 are formed in the side walls 106 and 108. While FIG. 5 shows only one film cooling hole associated with each of the projecting portions 142, 142' 146 and 146', it should be recognized there may actually be a row of aligned film cooling holes extending in a radial direction.

As can be seen from FIG. 5, the trailing edge cooling circuit 128 may receive a supply of cooling fluid from the supply cavity 140'.

While each cavity 140, 140' has been shown with just two projecting portions, it should be recognized that one or more of the cavities may have more than two projecting portions if the pressure side and/or suction side cooling circuits have different configurations. For example, if each of the cooling circuits has a five leg configuration, more rows of film cooling holes may be needed. Therefore, one or more of the cavities 140 and 140' may have more than two projecting portions.

Figure 6:
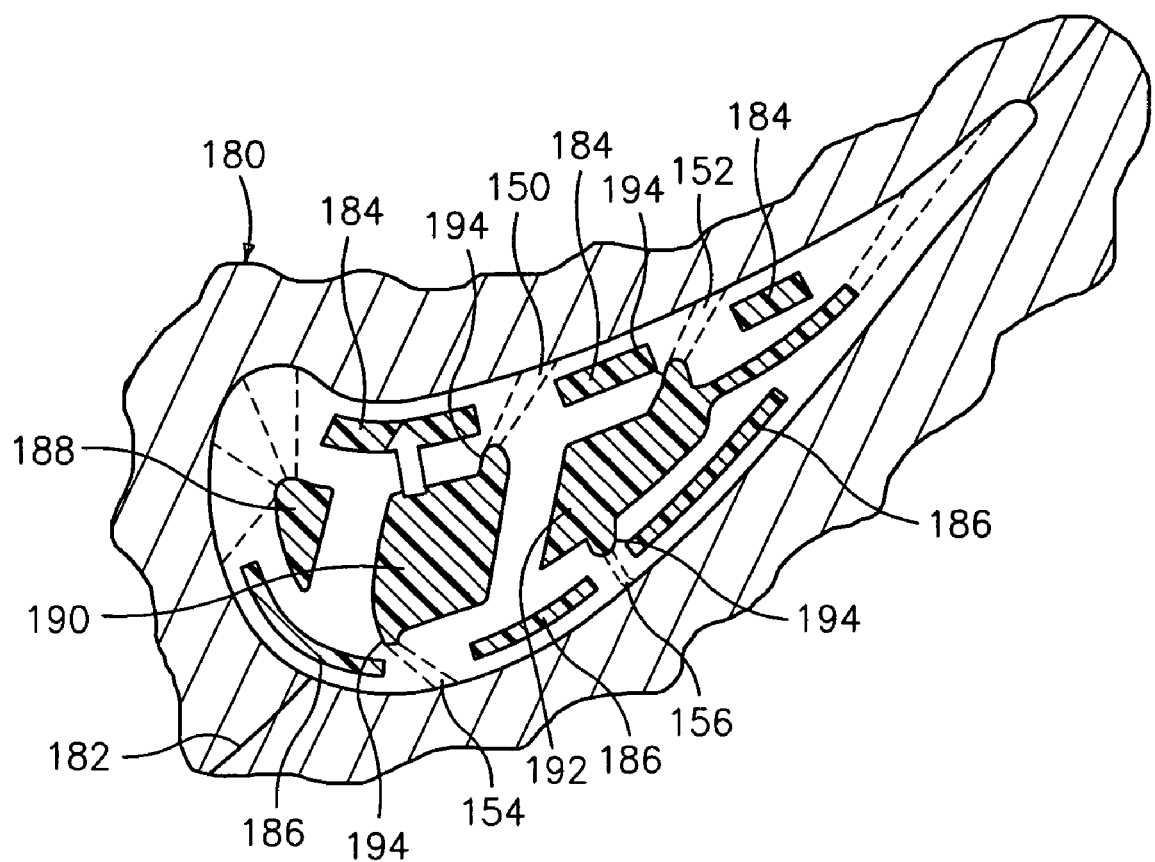
FIG. 6 is a cross sectional area of a mold and core system for forming the airfoil portion of FIG. 5.

The airfoil portion 100 shown in FIG. 5 may be formed by providing a multi-piece mold 180 have a parting line 182 as shown in FIG. 6. Positioned within the mold 180 is a first core 184 and a second core 186. The first core 184 has the configuration of the pressure side cooling circuit 110 and the second core 186 has the configuration of the suction side cooling circuit 118. Thus, if each of the cooling circuits 110 and 118 has a serpentine configuration, each of the cores 184 and 186 has a serpentine configuration. The cores 184 and 186 may be formed from any suitable core material known in the art. For example, the cores 184 and 186 may be formed from a refractory metal or metal alloy such as molybdenum or a molybdenum alloy. Alternatively, each of the cores 184 and 186 may be formed from a ceramic or a silica material.

Positioned within the mold 180 are a plurality of core elements 188, 190 and 192 for forming the supply cavities 132, 140 and 140'. Each of the core elements 188, 190, and 192 may be formed from any suitable material known in the art such as silica. As can be seen from, FIG. 6, the core elements 190 and 192 each have a plurality of bumps 194, which bumps 194 eventually lead to the formation of the projecting portions 140, 140', 146, and 146'. Each of the core elements 190 and 192 has a bump 194 on a first wall and a bump 194 on a second wall opposed to the first wall.

After the core elements 188, 190, and 192 are positioned within the mold 180, the airfoil portion 100 may be formed using any suitable casting technique known in the art. For example, an investment casting technique may be used wherein a wax pattern is formed around the core elements 184, 186, 188, 190, and 192 and a ceramic shell is formed about the wax pattern. The airfoil portion 100 may be cast from any suitable material known in the art such as a superalloy material. While not illustrated in FIG. 6, other portions of the turbine engine component such as a platform and a root portion may be cast and integrally formed with the airfoil portion 100.

After the airfoil portion has been cast and the molten material forming the airfoil portion has cooled and solidified, each of the core elements 184, 186, 188, 190, and 192 may be removed using any suitable technique known in the art. Thereafter, the film cooling holes 150, 152, 154, and 156 may be formed using any suitable drilling technique known in the art, such as EDM drilling. As shown in FIG. 5, the film cooling holes are formed so that they connect to the projecting portions 142, 142' 146, and 146'. In this way, the film cooling holes 150, 152, 154, and 156 receive cooling fluid from the cavities 140 and 140'.

The leading edge cooling circuit 126 and the trailing edge cooling circuit 128 may be formed using any suitable technique known in the art, such as drilling. These circuits may be formed prior to or after the film cooling holes 150, 152, 154, and 156 have been formed.

The present invention results in a minimization of thermal gradients to reduce debits in thermal mechanical fatigue life, allows for film cooling to reduce thermal load to the parts, and avoids back flow margin problems as the film holes 150, 152, 154, and 156 are feed with flow from the main cavities 140 and 140'.

While the present invention has been described in the context of a turbine blade, it should be apparent to one skilled in the art can use the present invention in other turbine engine components such as combustor panels, blade outer air seals, and vanes where cooling is needed.

It is apparent that there has been provided in accordance with the present invention high aspect ratio blade main core modifications for peripheral serpentine microcircuits. While the present invention has been described in the context of specific embodiments thereof, other unforeseeable alternatives modifications, and variations may become apparent to those skilled in the art having read the foregoing description. Accordingly, it is intended to embrace those alternatives, modifications, and variations as fall within the broad scope of the appended claims.

What is claimed is:

1. A turbine engine component comprising:
    an airfoil portion having a pressure side wall and a suction side wall;
    a first cooling circuit embedded within said pressure side wall, said first cooling circuit having at least two passageways embedded within said pressure side wall;
    a second cooling circuit embedded within said suction side wall, said second cooling circuit having at least two passageways embedded within said suction side wall;
    at least one cooling fluid supply cavity located between said pressure and suction side walls;
    each said cooling fluid supply cavity having a first projecting portion extending between adjacent ones of said embedded passageways in said first cooling circuit and a second projecting portion extending between adjacent ones of said embedded passageways in said second cooling circuit;
    said first projecting portion being located on a first side of the cooling fluid supply cavity and a second projecting portion on a second side of said cooling fluid supply cavity opposite to said first side;
    said first projecting portion being located adjacent a leading edge of said cooling fluid supply cavity and said second projecting portion being located adjacent a trailing edge of said cooling fluid supply cavity; and
    each said projecting portion communicating with at least one film cooling hole.

2. The turbine engine component according to claim 1, wherein said first projecting portion is located between two embedded passageways of said pressure side cooling circuit and extends in a radial direction and said second projecting portion is located between two embedded passageways of said suction side cooling circuit and extends in a radial direction.

3. The turbine engine component according to claim 1, wherein each said film cooling hole is a machined film cooling hole extending from an external surface of said airfoil portion to said projecting portion.

4. The turbine engine component according to claim 1, wherein said pressure side cooling circuit has a serpentine configuration with at least three legs through which said cooling fluid flows.

5. The turbine engine component according to claim 1, wherein said suction side cooling circuit has a serpentine configuration with at least three legs through which said cooling fluid flows.

6. The turbine engine component according to claim 1, further comprising a plurality of supply cavities positioned between said pressure side wall and said suction side wall and a plurality of cooling holes in each of said suction side and said pressure side communicating with said supply cavities.

7. The turbine engine component according to claim 6, further comprising a trailing edge cooling circuit communicating with one of said supply cavities.

8. The turbine engine component according to claim 1, further comprising a leading cooling circuit communicating with an additional supply cavity.

9. The turbine engine component according to claim 1, wherein said component comprises a turbine blade.

10. A method for forming an airfoil portion of a turbine engine component comprising the steps of:
    providing a first peripheral core having a plurality of legs in a location spaced from a first side of a mold;
    positioning a second peripheral core having a plurality of legs in a location spaced from a second side of said mold;
    positioning at least one central core between said first peripheral core and said second peripheral core so that each said core has at least one bump positioned between two adjacent legs of one of said first and second peripheral cores;
    casting an airfoil portion from a superalloy material; and
    removing said peripheral cores and said at least one central core so as to leave a first cooling microcircuit embedded in a pressure side wall, a second cooling microcircuit embedded in a suction side wall, and at least one central cooling fluid supply cavity having at least one projecting portion where said at least one bump had been located.

11. The method according to claim 10, further comprising forming at least one cooling hole in communication with said projecting portion.

12. The method according to claim 11, wherein said at least one cooling hole forming step comprises drilling a plurality of holes in at least one external surface of said airfoil portion.

13. The method according to claim 10, wherein said first peripheral core positioning step comprises positioning a first core having a serpentine configuration and wherein said second peripheral core positioning step comprises positioning a second core having a serpentine configuration.

14. The method according to claim 10, wherein said at least one central core positioning step comprises positioning at least one core having a first bump on a first surface and a second bump on a second surface opposed to said first surface.

15. The method according to claim 10, wherein said at least one central core positioning step comprises positioning a plurality of central cores having at least one bump within said mold.

16. The method according to claim 10, further comprising forming a trailing edge cooling circuit.

17. The method according to claim 10, further comprising forming a leading edge cooling circuit.

\* \* \* \* \*